US012665770B2

(12) United States Patent
Yavuz et al.

(10) Patent No.: US 12,665,770 B2
(45) Date of Patent: Jun. 23, 2026

(54) SYSTEM AND METHOD FOR CRYPTOGRAPHIC FORENSIC AUDITS ON LIGHTWEIGHT IoT AND DIGITAL ARCHIVES

(71) Applicant: UNIVERSITY OF SOUTH FLORIDA, Tampa, FL (US)

(72) Inventors: Attila A. Yavuz, Tampa, FL (US); Saif Eddine Nouma, Lutz, FL (US)

(73) Assignee: University of South Florida, Tampa, FL (US)

( * ) Notice: Subject to any disclaimer, the term of this patent is extended or adjusted under 35 U.S.C. 154(b) by 295 days.

(21) Appl. No.: 18/341,901

(22) Filed: Jun. 27, 2023

(65) Prior Publication Data

US 2024/0007300 A1     Jan. 4, 2024

Related U.S. Application Data

(60) Provisional application No. 63/356,792, filed on Jun. 29, 2022.

(51) Int. Cl.
| | |
|---|---|
| *H04L 9/32* | (2006.01) |
| *G16Y 30/10* | (2020.01) |
| *H04L 41/069* | (2022.01) |

(52) U.S. Cl.
CPC ............ *H04L 9/3247* (2013.01); *G16Y 30/10* (2020.01); *H04L 41/069* (2013.01)

(58) Field of Classification Search
CPC ..... H04L 9/3247; H04L 41/069; H04L 63/12; G16Y 30/10; H04W 12/06; H04W 12/10
See application file for complete search history.

(56) References Cited

U.S. PATENT DOCUMENTS

| | | | | |
|---|---|---|---|---|
| 8,230,329 B2 * | 7/2012 | Rohan | .................... | G06Q 10/10 |
| | | | | 715/234 |
| 10,587,416 B1 | 3/2020 | Yavuz | | |
| 2009/0193256 A1 * | 7/2009 | Takenaka | .............. | H04L 9/3249 |
| | | | | 713/176 |
| 2014/0096135 A1 * | 4/2014 | Kundu | .................... | G06F 9/455 |
| | | | | 718/1 |
| 2014/0136707 A1 * | 5/2014 | Beaty | .................. | H04L 63/0428 |
| | | | | 709/226 |
| 2014/0222813 A1 * | 8/2014 | Yang | ....................... | G06F 16/95 |
| | | | | 707/736 |

(Continued)

OTHER PUBLICATIONS

Alzain et al., "Cloud Computing Security: From Single to Multi-Clouds," 2012 45th Hawaii International Conference on System Sciences, Jan. 4, 2012, pp. 5490-5499.

(Continued)

*Primary Examiner* — Abdulkader M Alriyashi
(74) *Attorney, Agent, or Firm* — Meunier Carlin & Curfman LLC

(57) ABSTRACT

A new series of secure logging schemes that are referred to as Optimal Signatures for secure Logging (OSLO) are created. OSLO schemes are the first AS-based secure logging schemes that achieve small-constant tag and public key sizes with near-optimal signing and batch verification via various granularities. These features make them ideal for IoT-STaaS applications, wherein efficient signing and batch verification are critical for the resource-limited IoTs and cold storage servers, respectively.

12 Claims, 10 Drawing Sheets

(56)                  References Cited

U.S. PATENT DOCUMENTS

| | | | | |
|---|---|---|---|---|
| 2018/0013824 A1* | 1/2018 | Knopf | ...................... | H04L 9/321 |
| 2019/0044726 A1* | 2/2019 | Macieira | ............. | H04L 41/5003 |
| 2020/0396081 A1* | 12/2020 | Ansel | .................. | H04L 67/1097 |
| 2021/0258168 A1* | 8/2021 | Decoux | ................. | H04L 9/3247 |
| 2023/0090190 A1* | 3/2023 | Iila | .......................... | G06F 21/53 |
| | | | | 726/1 |

OTHER PUBLICATIONS

Amanullah et al., "Deep learning and big data technologies for IoT security," Computer Communications, Feb. 1, 2020, vol. 151, pp. 495-517.

American Bankers Association, ANSI X9.62-1998: Public Key Cryptography for the Financial Services Industry: The Elliptic Curve Digital Signature Algorithm (ECDSA), 1999.

Armbrust et al., "A view of cloud computing," Communications of the ACM, Apr. 1, 2010, vol. 53, No. 4, pp. 50-58.

Aumasson et al., "BLAKE2: simpler, smaller, fast as MD5," Applied Cryptography and Network Security: 11th International Conference, Jun. 25-28, 2013, Proceedings 11, pp. 119-135.

Bairavasundaram et al., "An Analysis of Data Corruption in the Storage Stack," ACM Transactions on Storage (TOS), Nov. 24, 2008, vol. 4, No. 3, pp. 1-28.

Bairavasundaram et al., "An Analysis of Latent Sector Errors in Disk Drives," Proceedings of the 2007 ACM SIGMETRICS International Conference on Measurement and Modeling of Computer Systems, Jun. 12, 2007, pp. 289-300.

Balakrishnan et al., "Pelican: A Building Block for Exascale Cold Data Storage," 11th USENIX Symposium on Operating Systems Design and Implementation (OSDI 14), 2014, pp. 351-365.

Barreto et al., "Fast hashing onto elliptic curves over fields of characteristic 3," Cryptology ePrint Archive, 2001, 11 pages.

Bellare et al., "Fast Batch Verification for Modular Exponentiation and Digital Signatures," Advances in Cryptology—EUROCRYPT'98: International Conference on the Theory and Application of Cryptographic Techniques, May 31-Jun. 4, 1998, Proceedings 17, pp. 236-250.

Bellare et al., "Introduction to modern cryptography," UCSD CSE Course, 2005, 1st edition, 2005, 283 pages.

Boneh et al., "Identity-Based Encryption from the Weil Pairing," Annual International Cryptology Conference, Aug. 2, 2001, pp. 213-229.

Boneh et al., "Short Signatures from the Weil Pairing," Journal of Cryptology, Sep. 2004, vol. 17, pp. 297-319.

Boyko et al., "Speeding up Discrete Log and Factoring Based Schemes via Precomputations," International Conference on the Theory and Applications of Cryptographic Techniques, May 31, 1998, pp. 221-235.

Coron et al., "Boneh et al.'s k-Element Aggregate Extraction Assumption is Equivalent to the Diffie-Hellman Assumption," Proceedings of the 9th International Conference on the Theory and Application of Cryptology (ASIACRYPT 03'), 2003, pp. 392-397.

Coron, J., "On the Exact Security of Full Domain Hash," Advances in Cryptology—CRYPTO 2000: 20th Annual International Cryptology Conference, Aug. 20-24, 2000, Proceedings 2000, 8 pages.

Costello et al., "FourQ : four-dimensional decompositions on a Q-curve over the Mersenne prime," Advances in Cryptology—ASIACRYPT 2015, 2015, pp. 214-215.

Costello et al., "SchnorrQ: Schnorr signatures on fourQ," MSR Tech Report, Jul. 2016, 5 pages.

Cronin et al., "On the Performance, Feasibility, and Use of Forward-Secure Signatures," Proceedings of the 10th ACM Conference on Computer and Communications Security, Oct. 27, 2003, pp. 131-144.

Crosby et al., "Efficient Data Structures for Tamper-Evident Logging," USENIX Security Symposium, Aug. 10, 2009, pp. 317-334.

Delgado-Mohatar et al., "An Energy-Efficient Symmetric Cryptography Based Authentication Scheme for Wireless Sensor Networks," Information Security Theory and Practices. Security and Privacy of Pervasive Systems and Smart Devices: 4th IFIP WG 11.2 International Workshop, WISTP 2010, Apr. 12-14, 2010, Proceedings 4, pp. 332-339.

Ducas et al., "Crystals-Dilithium: A Lattice-Based Digital Signature Scheme," IACR Transactions on Cryptographic Hardware and Embedded Systems, Feb. 14, 2018, vol. 2018, pp. 238-268.

Goldreich et al., "How to Construct Random Functions," Journal of the Association for Computing Machinery (JACM), Aug. 10, 1986, vol. 33, No. 4, pp. 792-807.

Hankerson et al., "Guide to Elliptic Curve Cryptography," Encyclopedia of Cryptography, Security and Privacy, Springer, 2004, 332 pages.

Hartung, G., "Attacks on Secure Logging Schemes," International Conference on Financial Cryptography and Data Security, Apr. 3, 2017, pp. 268-284.

Holt, J., "Logcrypt: Forward Security and Public Verification for Secure Audit Logs," Proceedings of the 2006 Australasian Workshops on Grid Computing and E-Research, Jan. 1, 2006, vol. 54, pp. 203-211.

Itkis et al., "Forward-Secure Signatures with Optimal Signing and Verifying," Advances in Cryptology—CRYPTO 2001: 21st Annual International Cryptology Conference, Aug. 19-23, 2001 Proceedings 21, pp. 332-354.

Kampanakis et al., "BAFi: a practical cryptographic secure audit logging scheme for digital forensics," Security and Communication Networks, Nov. 25, 2015, vol. 8, No. 17, pp. 3180-3190.

Katz et al., "Aggregate Message Authentication Codes," Cryptographers' Track at the RSA Conference, Apr. 8, 2008, pp. 155-169.

Levandoski et al., "Identifying Hot and Cold Data in Main-Memory Databases," 2013 IEEE 29th International Conference on Data Engineering (ICDE), Apr. 8, 2013, pp. 26-37.

Ma et al., "A New Approach to Secure Logging," ACM Transactions on Storage (TOS), Mar. 31, 2009, vol. 5, No. 1, pp. 1-21.

Ma et al., "Forward-Secure Sequential Aggregate Authentication," 2007 IEEE Symposium on Security and Privacy (SP'07), May 20, 2007, pp. 86-91.

Ma, D., "Practical forward secure sequential aggregate signatures," Proceedings of the 2008 ACM Symposium on Information, Computer and Communications Security, Mar. 18, 2008, pp. 341-352.

Malkin et al., "Efficient Generic Forward-Secure Signatures With an Unbounded Number of Time Periods," International Conference on the Theory and Applications of Cryptographic Techniques, Apr. 28, 2002, pp. 400-417.

Marson et al., "Even more practical secure logging: Tree-based seekable sequential key generators," Computer Security—ESORICS 2014: 19th European Symposium on Research in Computer Security, Sep. 7-11, 2014, Proceedings 19, Part II, pp. 37-54.

Mu et al., "Compact Sequential Aggregate Signatures," Proceedings of the 2007 ACM Symposium on Applied Computing, Mar. 11, 2007, pp. 249-253.

Nouma et al., "Practical Cryptographic Forensic Tools for Lightweight Internet of Things and Cold Storage Systems," Proceedings of the 8th ACM/IEEE Conference on Internet of Things Design and Implementation, May 9, 2023, pp. 340-353.

Ozmen et al., "Energy-Aware Digital Signatures for Embedded Medical Devices," 2019 IEEE Conference on Communications and Network Security (CNS), Jun. 10, 2019, pp. 55-63.

Pabbuleti et al., "Energy budget analysis for signature protocols on a self-powered wireless sensor node," Radio Frequency Identification: Security and Privacy Issues: 10th International Workshop, Jul. 21-23, 2014, pp. 123-136.

Pinheiro et al., "Failure Trends in a Large Disk Drive Population," FAST '07: 5th USENIX Conference on File and Storage Technologies, 2007, pp. 17-28.

Reyzin et al., "Better than BiBa: Short One-time Signatures with Fast Signing and Verifying," Australasian Conference on Information Security and Privacy, Jun. 21, 2002, pp. 144-153.

Rivest et al., "A Method for Obtaining Digital Signatures and Public-Key Cryptosystems," Communications of the ACM, Feb. 1, 1978, vol. 21, No. 2, pp. 120-126.

(56) References Cited

OTHER PUBLICATIONS

Schneier et al., "Secure Audit Logs to Support Computer Forensics," ACM Transactions on Information and System Security (TISSEC), May 1, 1999, vol. 2, No. 2, pp. 159-176.

Schnorr, C.P., "Efficient Signature Generation by Smart Cards," Journal of Cryptology, Jan. 1991, vol. 4, pp. 161-174.

Schroeder et al., "Understanding disk failure rates: What does an MTTF of 1,000,000 hours mean to you?," ACM Transactions on Storage (TOS), Oct. 1, 2007, vol. 3, No. 3, pp. 1-16.

Seyitoglu et al., "Compact and Resilient Cryptographic Tools for Digital Forensics," 2020 IEEE Conference on Communications and Network Security (CNS), Jun. 29, 2020, pp. 1-9.

Shah et al., "Privacy-Preserving Audit and Extraction of Digital Contents," Cryptology ePrint Archive, 2008, pp. 1-21.

Shoup, V., "A Proposal for an ISO Standard for Public Key Encryption," Cryptology ePrint Archive, 2001, pp. 1-63.

Stinson, D., "Cryptography: Theory and Practice," CRC/C&H, 2002, Second Edition, 573 pages.

Sun et al., "Efficient completely non-malleable and RKA secure public key encryptions," Information Security and Privacy: 21st Australasian Conference, ACISP, Jul. 4-6, 2016, Proceedings 21, Part II, pp. 134-150.

Turan et al., "Status Report on the Second Round of the NIST Lightweight Cryptography Standardization Process," National Institute of Standards and Technology Internal Report, Jul. 20, 2021, vol. 8369, No. 10.6028, 92 pages.

Yavuz et al., "Efficient, Compromise Resilient and Append-only Cryptographic Schemes for Secure Audit Logging," Financial Cryptography and Data Security: 16th International Conference, Feb. 27-Mar. 2, 2012, pp. 148-163.

Yavuz, A., "ETA: Efficient and Tiny and Authentication for Heterogeneous Wireless Systems," Proceedings of the Sixth ACM Conference on Security and Privacy in Wireless and Mobile Networks, Apr. 17, 2013, pp. 67-72.

Yazuv et al., "BAF and FI-BAF: Efficient and Publicly Verifiable Cryptographic Schemes for Secure Logging in Resource-Constrained Systems," ACM Transactions on Information and System Security (TISSEC), Jul. 1, 2012, vol. 15, No. 2, pp. 1-28.

Yazuv et al., "BAF: An Efficient Publicly Verifiable Secure Audit Logging Scheme for Distributed Systems," 2009 Annual Computer Security Applications Conference, Dec. 7, 2009, pp. 219-228.

Zaverucha et al., "Short One-Time Signatures," Advances in Mathematics of Communications, Jul. 31, 2011, vol. 5, No. 3, pp. 473-488.

* cited by examiner

100

Figure 2:
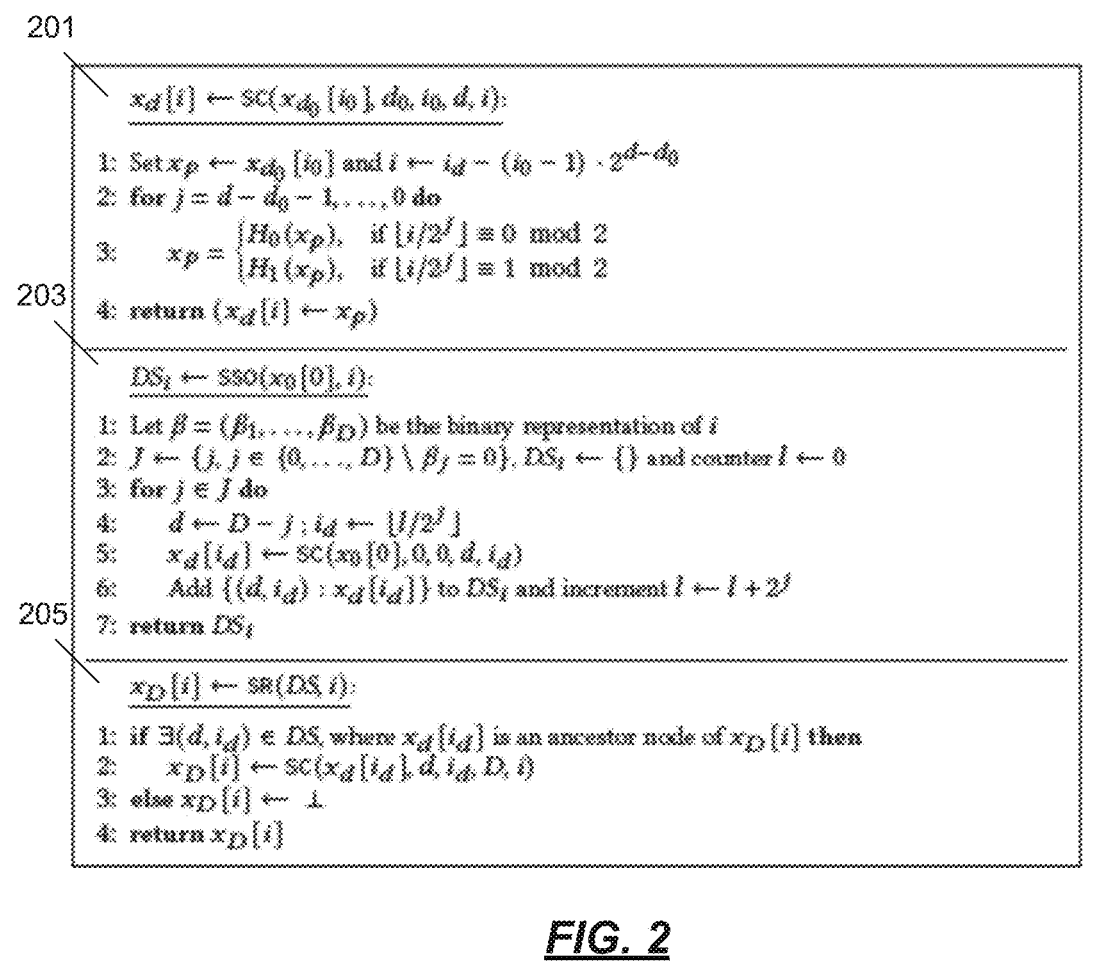

201

203

$x_d[i] \leftarrow SC(x_{d_0}[i_0], d_0, i_0, d, i)$:

1: Set $x_p \leftarrow x_{d_0}[i_0]$ and $i \leftarrow i_d - (i_0 - 1) \cdot 2^{d - d_0}$
2: for $j = d - d_0 - 1, \ldots, 0$ do
3:    $x_p = \begin{cases} H_0(x_p), & \text{if } \lfloor i/2^j \rfloor \equiv 0 \bmod 2 \\ H_1(x_p), & \text{if } \lfloor i/2^j \rfloor \equiv 1 \bmod 2 \end{cases}$
4: return $(x_d[i] \leftarrow x_p)$

205

$DS_I \leftarrow SSD(x_0[0], I)$:

1: Let $\beta = (\beta_1, \ldots, \beta_D)$ be the binary representation of $I$
2: $J \leftarrow \{j, j \in (0, \ldots, D) \setminus \beta_j = 0\}$, $DS_I \leftarrow ()$ and counter $l \leftarrow 0$
3: for $j \in J$ do
4:    $d \leftarrow D - j$ ; $i_d \leftarrow \lfloor l/2^j \rfloor$
5:    $x_d[i_d] \leftarrow SC(x_0[0], 0, 0, d, i_d)$
6:    Add $((d, i_d) : x_d[i_d])$ to $DS_I$ and increment $l \leftarrow l + 2^j$
7: return $DS_I$ $x_D[i] \leftarrow SR(DS, i)$:

1: if $\exists (d, i_d) \in DS$, where $x_d[i_d]$ is an ancestor node of $x_D[i]$ then
2:    $x_D[i] \leftarrow SC(x_d[i_d], d, i_d, D, i)$
3: else $x_D[i] \leftarrow \bot$
4: return $x_D[i]$

Figure 4A:
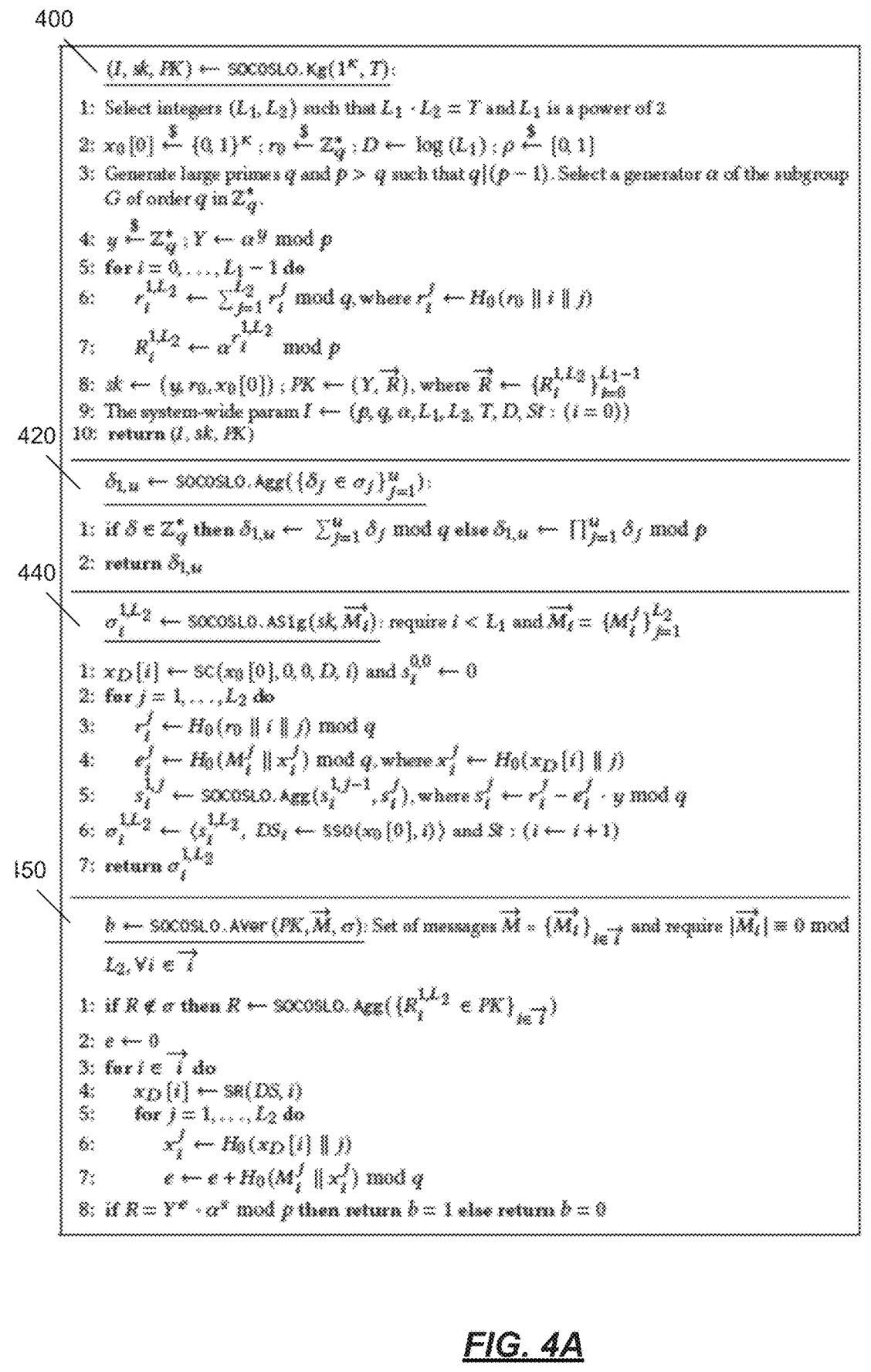

$(I, sk, PK) \leftarrow$ SCCOSLO.Kg$(1^\kappa, T)$:

1: Select integers $(L_1, L_2)$ such that $L_1 \cdot L_2 = T$ and $L_1$ is a power of 2

2: $x_0[0] \xleftarrow{\$} \{0,1\}^\kappa$ ; $r_0 \xleftarrow{\$} \mathbb{Z}_q^*$ ; $D \leftarrow \log(L_1)$ ; $\rho \xleftarrow{\$} \{0,1\}$ 3: Generate large primes $q$ and $p > q$ such that $q|(p-1)$. Select a generator $\alpha$ of the subgroup $G$ of order $q$ in $\mathbb{Z}_q^*$.

4: $y \xleftarrow{\$} \mathbb{Z}_q^*$ ; $Y \leftarrow \alpha^y \bmod p$

5: for $i = 0, \ldots, L_1 - 1$ do

6: $\quad r_i^{1,L_2} \leftarrow \sum_{j=1}^{L_2} r_i^j \bmod q$, where $r_i^j \leftarrow H_0(r_0 \| i \| j)$ 7: $\quad R_i^{1,L_2} \leftarrow \alpha^{r_i^{1,L_2}} \bmod p$ 8: $sk \leftarrow (y, r_0, x_0[0])$ ; $PK \leftarrow (Y, \vec{R})$, where $\vec{R} \leftarrow \{R_i^{1,L_2}\}_{i=0}^{L_1-1}$ 9: The system-wide param $I \leftarrow (p, q, \alpha, L_1, L_2, T, D, St : (i = 0))$ 10: return $(I, sk, PK)$

420

$\delta_{1,u} \leftarrow$ SCCOSLO.Agg$(\{\delta_j \in \sigma_j\}_{j=1}^u)$:

1: if $\delta \in \mathbb{Z}_q^*$ then $\delta_{1,u} \leftarrow \sum_{j=1}^u \delta_j \bmod q$ else $\delta_{1,u} \leftarrow \prod_{j=1}^u \delta_j \bmod p$ 2: return $\delta_{1,u}$

440

$\sigma_i^{1,L_2} \leftarrow$ SCCOSLO.ASig$(sk, \vec{M_i})$: require $i < L_1$ and $\vec{M_i} = \{M_i^j\}_{j=1}^{L_2}$ 1: $x_D[i] \leftarrow$ SC$(x_0[0], 0, 0, D, i)$ and $s_i^{0,0} \leftarrow 0$ 2: for $j = 1, \ldots, L_2$ do 3: $\quad r_i^j \leftarrow H_0(r_0 \| i \| j) \bmod q$ 4: $\quad e_i^j \leftarrow H_0(M_i^j \| x_i^j) \bmod q$, where $x_i^j \leftarrow H_0(x_D[i] \| j)$ 5: $\quad s_i^{1,j} \leftarrow$ SCCOSLO.Agg$(s_i^{1,j-1}, s_i^j)$, where $s_i^j \leftarrow r_i^j - e_i^j \cdot y \bmod q$ 6: $\sigma_i^{1,L_2} \leftarrow (s_i^{1,L_2}, DS_i \leftarrow$ SSO$(x_0[0], i))$ and $St : (i \leftarrow i + 1)$ 7: return $\sigma_i^{1,L_2}$

450

$b \leftarrow$ SCCOSLO.AVer$(PK, \vec{M}, \sigma)$: Set of messages $\vec{M} = \{\vec{M_i}\}_{i \in \vec{I}}$ and require $|\vec{M_i}| \equiv 0 \bmod L_2, \forall i \in \vec{I}$ 1: if $R \notin \sigma$ then $R \leftarrow$ SCCOSLO.Agg$(\{R_i^{1,L_2} \in PK\}_{i \in \vec{I}})$ 2: $e \leftarrow 0$ 3: for $i \in \vec{I}$ do 4: $\quad x_D[i] \leftarrow$ SR$(DS, i)$ 5: $\quad$ for $j = 1, \ldots, L_2$ do 6: $\quad\quad x_i^j \leftarrow H_0(x_D[i] \| j)$ 7: $\quad\quad e \leftarrow e + H_0(M_i^j \| x_i^j) \bmod q$ 8: if $R = Y^e \cdot \alpha^s \bmod p$ then return $b = 1$ else return $b = 0$

Figure 4B:
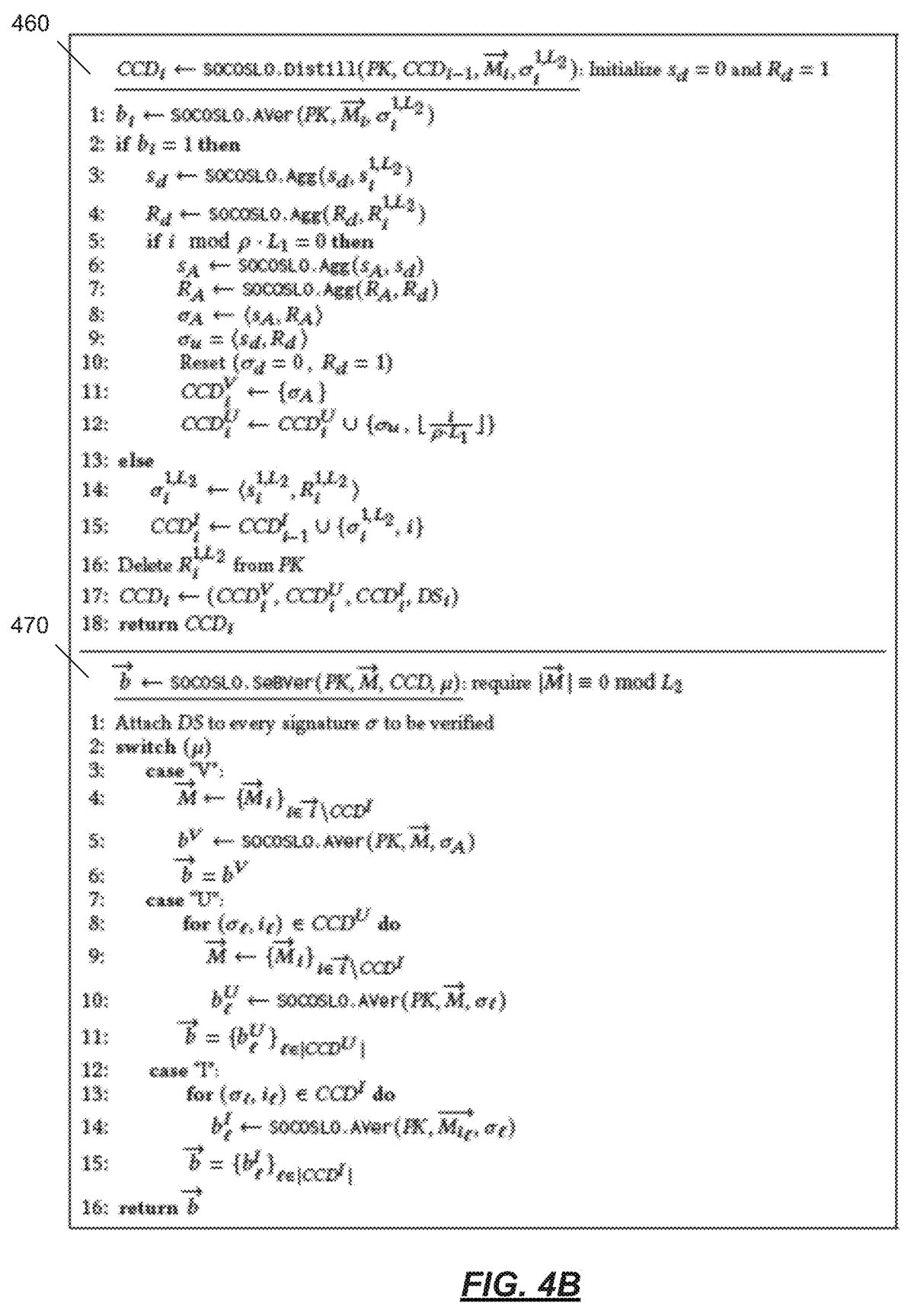

$CCD_i \leftarrow \text{SOCOSLO.Distill}(PK, CCD_{i-1}, \vec{M}_i, \sigma_i^{1,L_2})$: Initialize $s_d = 0$ and $R_d = 1$ 1: $b_i \leftarrow \text{SOCOSLO.Aver}(PK, \vec{M}_i, \sigma_i^{1,L_2})$
2: if $b_i = 1$ then
3:    $s_d \leftarrow \text{SOCOSLO.Agg}(s_d, s_i^{1,L_2})$
4:    $R_d \leftarrow \text{SOCOSLO.Agg}(R_d, R_i^{1,L_2})$
5:    if $i \mod \rho \cdot L_1 = 0$ then
6:       $s_A \leftarrow \text{SOCOSLO.Agg}(s_A, s_d)$
7:       $R_A \leftarrow \text{SOCOSLO.Agg}(R_A, R_d)$
8:       $\sigma_A \leftarrow (s_A, R_A)$
9:       $\sigma_M = (s_d, R_d)$
10:       Reset $(\sigma_d = 0, R_d = 1)$
11:       $CCD_i^V \leftarrow \{\sigma_A\}$
12:       $CCD_i^U \leftarrow CCD_i^U \cup (\sigma_M, \lfloor \frac{i}{\rho \cdot L_1} \rfloor)$ 13: else
14:    $\sigma_i^{1,L_2} \leftarrow (s_i^{1,L_2}, R_i^{1,L_2})$
15:    $CCD_i^I \leftarrow CCD_{i-1}^I \cup (\sigma_i^{1,L_2}, i)$
16: Delete $R_i^{1,L_2}$ from $PK$
17: $CCD_i \leftarrow (CCD_i^V, CCD_i^U, CCD_i^I, DS_i)$
18: return $CCD_i$

470

$\vec{b} \leftarrow \text{SOCOSLO.Saever}(PK, \vec{M}, CCD, \mu)$: require $|\vec{M}| \equiv 0 \mod L_2$ 1: Attach $DS$ to every signature $\sigma$ to be verified
2: switch $(\mu)$
3:    case "V":
4:       $\vec{M} \leftarrow \{\vec{M}_i\}_{i \in \mathcal{I} \backslash CCD^I}$
5:       $b^V \leftarrow \text{SOCOSLO.Aver}(PK, \vec{M}, \sigma_A)$
6:       $\vec{b} = b^V$
7:    case "U":
8:       for $(\sigma_\ell, i_\ell) \in CCD^U$ do
9:          $\vec{M} \leftarrow \{\vec{M}_i\}_{i \in \mathcal{I} \backslash CCD^I}$
10:          $b_\ell^U \leftarrow \text{SOCOSLO.Aver}(PK, \vec{M}, \sigma_\ell)$
11:       $\vec{b} = (b_\ell^U)_{\ell \in |CCD^U|}$
12:    case "I":
13:       for $(\sigma_\ell, i_\ell) \in CCD^I$ do
14:          $b_\ell^I \leftarrow \text{SOCOSLO.Aver}(PK, \vec{M}_{i_\ell}, \sigma_\ell)$
15:       $\vec{b} = (b_\ell^I)_{\ell \in |CCD^I|}$
16: return $\vec{b}$

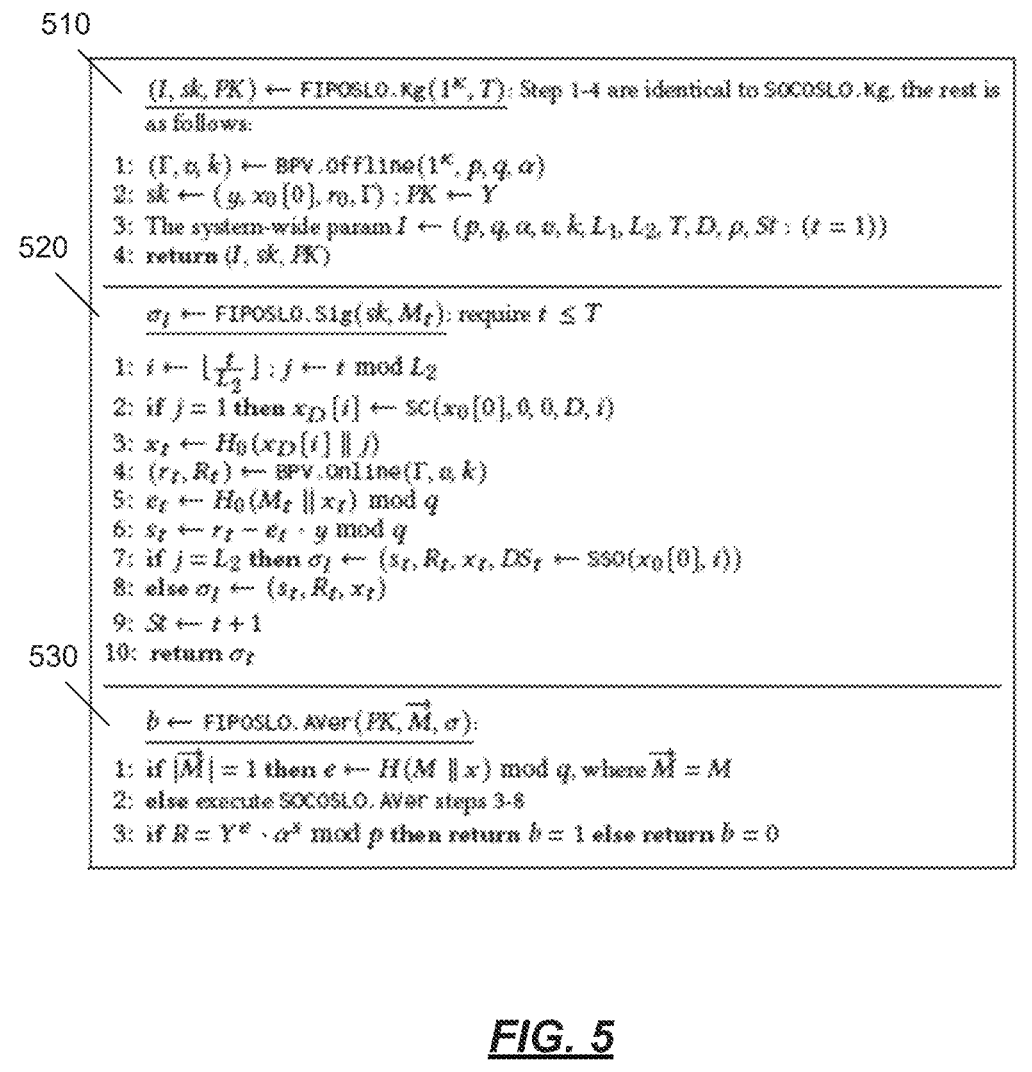

$(I, sk, PK) \leftarrow \text{FIPOSLO.Kg}(1^\kappa, T)$: Step 1-4 are identical to SOCOSLO.Kg, the rest is as follows:

1: $(\Gamma, a, k) \leftarrow \text{BPV.offline}(1^\kappa, \beta, q, \alpha)$
2: $sk \leftarrow (g, x_0[0], r_0, \Gamma)$ ; $PK \leftarrow Y$
3: The system-wide param $I \leftarrow (\beta, q, \alpha, a, k, L_1, L_2, T, D, \rho, St : (t=1))$
4: return $(I, sk, PK)$ $\sigma_t \leftarrow \text{FIPOSLO.Sig}(sk, M_t)$: require $t \leq T$ 1: $i \leftarrow \lfloor \frac{t}{L_2} \rfloor$ ; $j \leftarrow t \bmod L_2$
2: if $j = 1$ then $x_D[i] \leftarrow \text{SC}(x_0[0], 0, 0, D, i)$
3: $x_t \leftarrow H_0(x_D[i] \| j)$
4: $(r_t, R_t) \leftarrow \text{BPV.online}(\Gamma, a, k)$
5: $e_t \leftarrow H_0(M_t \| x_t) \bmod q$
6: $s_t \leftarrow r_t - e_t \cdot g \bmod q$
7: if $j = L_2$ then $\sigma_t \leftarrow (s_t, R_t, x_t, DS_t \leftarrow \text{SSO}(x_0[0], i))$
8: else $\sigma_t \leftarrow (s_t, R_t, x_t)$
9: $St \leftarrow t + 1$
10: return $\sigma_t$

530

$b \leftarrow \text{FIPOSLO.Aver}(PK, \vec{M}, \sigma)$:

1: if $|\vec{M}| = 1$ then $e \leftarrow H(M \| x) \bmod q$, where $\vec{M} = M$
2: else execute SOCOSLO.AVer steps 3-8
3: if $R = Y^e \cdot a^s \bmod \beta$ then return $b = 1$ else return $b = 0$

*FIG. 5*

Generate a log by logger device — 610

Generate aggregate signature — 620

Provide log and aggregate signature to distiller device — 630

Receive log and aggregate signature from logger device — 640

Based on received log, aggregate signature and public key, validate each entry in the log — 650

Provide batched validated and not validated entries separately to cold storage server — 660

600

Receive validated and not validated entries ⟋710

Store validated and not validated entries ⟋720

Audit at least some of the stored entries ⟋730

Allow one or users to access the stored validated and not validated entries ⟋740

<u>700</u>

806

804

System Memory

Volatile

Non-Volatile

Processing
Unit 802

Removable Storage
808

Non-Removable
Storage 710

Output Device(s)
816

Input Device(s) 814

Communication
Connection(s) 812

800

SYSTEM AND METHOD FOR CRYPTOGRAPHIC FORENSIC AUDITS ON LIGHTWEIGHT IoT AND DIGITAL ARCHIVES

CROSS-REFERENCE TO RELATED APPLICATIONS

This application claim priority to U.S. provisional patent application Ser. No. 63/356,792, titled SYSTEM AND METHOD FOR CRYPTOGRAPHIC FORENSIC AUDITS ON LIGHTWEIGHT IOT AND DIGITAL ARCHIVES, filed on Jun. 29, 2022. The disclosure of which is hereby incorporated by reference in its entirety.

STATEMENT OF GOVERNMENT SUPPORT

This invention was made with government support under Grant No. CNS-1917627, awarded by the National Science Foundation. The government has certain rights in the invention.

BACKGROUND

System logs are vital tools for any security-critical applications. They capture important events (e.g., user activity, errors, security breaches), making them an important target for attackers. Recent cyberattacks employ anti-forensics techniques to hide any evidence, namely by deleting or modifying log files. As such, administrators and/or verifiers cannot identify the source of errors during an incident investigation. Thereby, ensuring the trustworthiness of log files is a well-known topic for both authorities and practitioners.

The emerging IoT harbors a sheer amount of IoT devices (e.g., sensors) that collect sensitive information (e.g., financial, health, personal) from the environment. These data and their metadata (i.e., log files) must be protected against such cyber-attacks (e.g., impersonation, tampering) by ensuring their authentication, integrity, and confidentiality.

However, IoT devices are known to be resource-limited, rendering them more vulnerable to such cyber-attacks. Indeed, IoT devices do not have the necessary storage capacity to keep locally the log files. Additionally, they are more vulnerable to (especially cyber-physical) attacks, and therefore there is a major risk of log tampering.

A common practice is to securely offload log streams to a cloud storage solution for future analytics and forensic investigation. Storage-as-a-Service (STaaS) offers advanced data storage and infrastructure for end-users. However, it is highly expensive to retain append-only files (i.e., logs) on fast-access cloud servers which are usually dedicated to frequently accessed data. Cold storage solution is a new type of data warehouse, designed to host large-scale archives. As such, Cold-STaaS becomes the best alternative to keep such rarely used yet valuable log files.

An ideal secure log authentication scheme for IoT-STaaS should offer (at minimum) the following properties:

Scalability, Public Verifiability, and Non-Repudiation: (i) The cryptographic solution should be scalable to large IoT networks. (ii) It should allow any entity to verify the trustworthiness of information (e.g., meta-data, logs) by external parties. (iii) It should provide non-repudiation feature, which is essential for digital forensics and legal dispute resolution (e.g., financial, health). These features are usually offered by digital signatures.

Logger Efficiency: The cryptographic mechanisms must respect the limited resources (e.g., battery, memory, CPU) for low-end IoT devices (e.g., sensors), which are expected to operate for long durations without a replacement. (i) The authentication process should introduce a low computational overhead that translates into minimum energy consumption. (ii) The signatures should be compact to reduce the memory and transmission overhead. (iii) A small cryptographic code size is desirable to reduce the memory footprint.

Cloud Storage and Verification Efficiency: Cold storage systems maintain sheer sizes of data (e.g., order of TB s). This requires an ability to compress cryptographic data, while periodic security controls necessitate fast batch verification.

Flexible Verification Granularity: There is usually a performance and precision trade-off for secure log verification. For example, the authentication of the entire log stream with a single condensed tag offers minimal storage and fast verification time. However, having a single altered log entry renders the overall authentication invalid. Alternatively, signatures can be kept individually, per log entry, for the highest precision, but with high storage overhead. Hence, the cryptographic solution should permit for both logger and cold storage to adjust the storage granularity and verification precision depending on the application requirements.

It is a highly challenging task to devise a digital signature scheme that meets the stringent performance and security requirements of both IoT devices and STaaS simultaneously.

SUMMARY

Novel digital signatures for logs called Optimal Signatures for secure Logging (OSLO) are provided. OSLO are the first digital signatures to offer both small-constant signature and public key sizes with near-optimal signing and batch verification via various granularities. New design features such as one-time randomness management, flexible aggregation along with various optimizations are introduced to attain these seemingly conflicting properties simultaneously. OSLO offers 50× faster verification than the most compact alternative with equal signature sizes, while also being several magnitudes more compact than its most logger efficient counterparts. These properties make OSLO an ideal choice for the IoT-STaaS, wherein lightweight logging and efficient batch verification of massive-size logs are vital for the IoT edge and cold storage servers, respectively.

In some aspects, the techniques described herein relate to a system for cryptographic verifiability including: a plurality of logger devices; at least one distiller device; and at least one cold storage server, wherein each logger device is adapted to: generate a log, wherein the log includes a plurality of entries and each entry is associated with a digital signature; and provide the generated log to the at least one distiller device, wherein the at least one distiller device is adapted to: receive a log from each of the logger devices, and for each received log from a logger device: validate each entry in the log using the associated digital signature; for each entry in the log that is validated: batch the validated entries and associated digital signatures; and provide the batched validated entries to the at least one cold storage server; for each entry in the log that is not validated: batch the not validated entries and associated digital signatures; and provide the batched not validated entries to the at least one cold storage server; and wherein the at least one cold storage server is adapted to: receive the batched validated and not validated entries; audit at least some of the batched validated entries; and allow one or more external users to view the batched validated and not validated entries.

In some aspects, the techniques described herein relate to a system, wherein each logger of the plurality of loggers is an internet-of-things device.

In some aspects, the techniques described herein relate to a system, wherein each logger is further adapted to generate an aggregate signature for each entry in the generated log, and provide the aggregate signature to the at least one distilling device with the generated log.

In some aspects, the techniques described herein relate to a system, wherein the at least one distiller device is adapted to, for each received log from a logger device: receive a public key associated with the at logger device; and validate each entry in the log using the aggregated digital signature and the received public key.

In some aspects, the techniques described herein relate to a system, wherein the aggregate signature is am EC-based aggregate signature.

In some aspects, the techniques described herein relate to a system, wherein each logger generates the aggregate signature using a tree-based seed data structure.

In some aspects, the techniques described herein relate to a system, wherein the distiller adapted to provide the batched validated entries to the at least one cold storage server includes the distiller adapted to generate an aggregated digital signature for the batched validated entries, and provide the generated digital signature with the batched validated entries.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

It is to be understood that both the foregoing general description and the following detailed description are exemplary and explanatory only and are not restrictive of the systems and methods as claimed.

BRIEF DESCRIPTION OF THE DRAWINGS

The accompanying figures, which are incorporated in and constitute a part of this specification, illustrate several aspects of the disclosure, and together with the description, serve to explain the principles of the disclosure.

FIG. 2 is an illustration of Seed Management Functions 201, 203, and 205;

FIG. 4A is an illustration of the aggregate signature functions 400, 420, 440, and 450 of SOCOSLO;

FIG. 4B is an illustration of the aggregate signature functions 460 and 470 of SOCOSLO;

FIG. 5 is an illustration of the functions 510, 520, and 530 of FIPOSLO;

4

Figure 8:
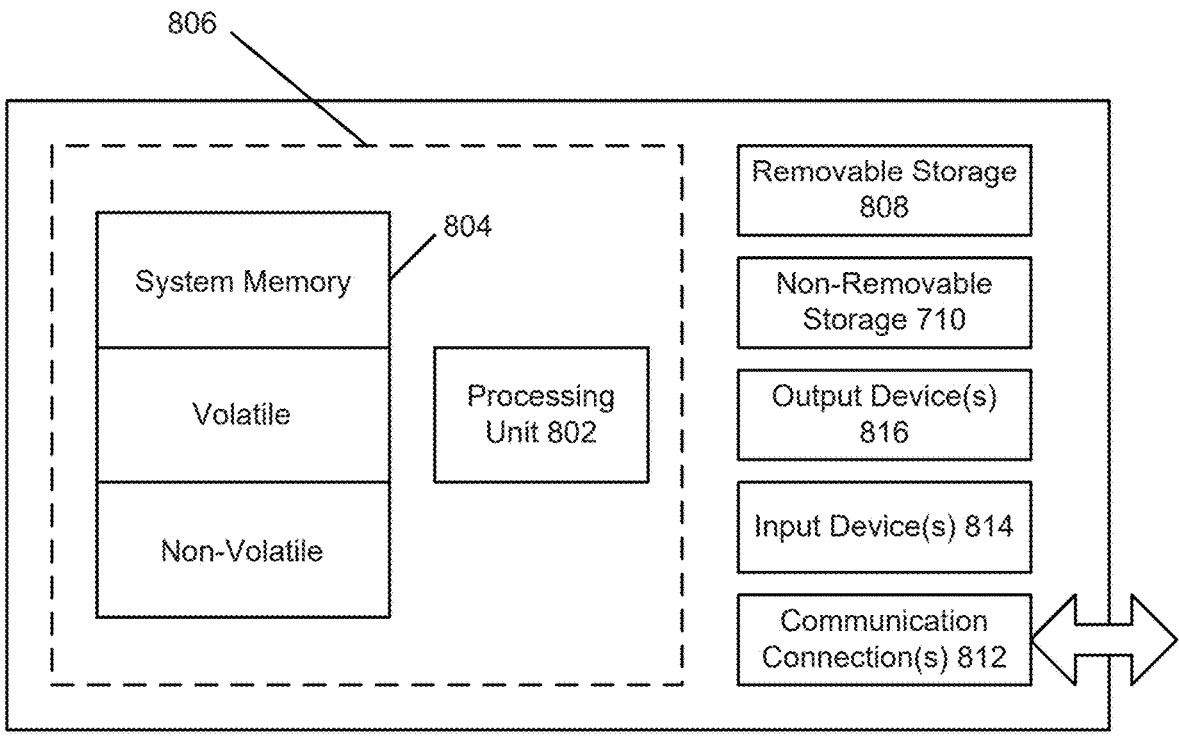

FIG. 8 shows an exemplary computing environment in which example embodiments and aspects may be implemented.

DETAILED DESCRIPTION

A new series of secure logging schemes that are referred to as Optimal Signatures for secure Logging (OSLO) are created and described. OSLO schemes are the first AS-based secure logging schemes that achieve small-constant tag and public key sizes with near-optimal signing and batch verification via various granularities. These features make them ideal for IoT-STaaS applications, wherein efficient signing and batch verification are critical for the resource-limited IoTs and cold storage servers, respectively.

Elliptic-Curve (EC)-based signatures usually offer the most compact tag sizes with a better signing efficiency compared to RSA-based and pairing-based alternatives. However, the most efficient EC-based signatures (e.g., Ed25519 and SchnorrQ) still require at least one expensive operation (i.e., EC scalar multiplication) during signing. Many techniques attempted to address this bottleneck. A naive approach is to pre-compute private/public commitments during the key generation. This is at the cost of a linear storage overhead on the signer. As the number of log entries grows, such storage becomes infeasible on resource-constrained devices.

An alternative approach is to eliminate the public commitments (both computation and storage) from signature generation, by replacing them with one-time random seeds. Despite being highly signer efficient, these approaches require linear public key storage at the verifier, which incurs extreme overhead on ColdSTaaS (e.g., ≈3.3 TB for $2^{35}$ log entries). Overall, AS scheme is either efficient for the signer but with the expense of extreme storage cost and verification overhead, or expensive for the low-end device in terms of signing and storage overhead.

In OSLO, these limitations are addressed by putting forward several new design approaches. (i) A new randomness management mechanism is introduced that achieves $O(\log_2 T)$ intermediate and $O(1)$ final one-time seed storage and computation. This approach eliminates the linear server storage while preserving optimal and deterministic signing via a tree-based seed data structure that respects the post-signature disclosure requirement of EC-based signatures. (ii) These schemes can aggregate additive and multiplicative homomorphic signature components separately with any desired granularity. This permits the compression of tags either at the IoT side per epoch, and/or compact them individually at the verifier. (iii) Two instantiations of OSLO are proposed: Signer-Optimal Coarse-grained OSLO (SO-COSLO) and Fine-grained Public-key OSLO (FIPOSLO). OSLO significantly outperforms their counterparts for the cold storage and verification time, with various granularities and high signer performance.

Compact Cold Cryptographic Storage and Fast Verification: The described schemes were compared with their alternatives for cryptographic storage and total verification times for 2 entries (each is of size 32 bytes). OSLO achieves the fastest verification and compact storage among their counterparts. (i) They enable total storage of just 0.10 KB, which is several magnitudes more compact than alternative EC-based signatures (e.g., Ed25519, FI-BAF) with TBs of storage. (ii) SOCOSLO has 7× smaller signature than C-RSA and the same size as BLS, but with 9× and 50× faster verification, respectively. It is 24× faster than its most signer-efficient counterpart FI-BAF.

Flexible Verification Granularities and Architectures: (i) in some IoT applications, IoT devices periodically stream their sensing reports to a verifier. In SOCOSLO, the logger signs each entry as collected and sequentially aggregates into a single "umbrella signature" to be uploaded to the verifier per epoch. SOCOSLO has a compact signature with the fastest verification (89× than BLS) for an epoch level (e.g., L1=256 items) of granularity (i.e., coarse-grained). However, it requires O(L1) initial public keys at the verifier but with O(1) final public key at the cold storage. (ii) FIPOSLO keeps every signature separately to be authenticated and aggregated at the distiller. This enables the highest level of granularity (i.e., fine-grained) and O(1) public key size. (iii) OSLO introduces a distillation process, in which the entries are verified and organized with a desired degree of granularity. The distillation can be done with an intermediate verifier (e.g., an edge cloud) or by the cold storage server itself.

Near-optimal Logging Efficiency: OSLO schemes are highly signing efficient makes them ideal alternatives for logging in the resource-limited IoT devices. (i) SOCOSLO achieves a near-optimal signing by eliminating costly operations (e.g., EC multiplication). This makes it 27× and 40× faster than the most compact traditional and aggregate counterparts SchnorrQ and BLS, respectively. While as fast as FI-BAF, SOCOSLO is also many magnitudes more compact at the cold storage with 20× faster verification. (ii) FIPOSLO is the second-fastest alternative at the signer but with the finest granularity and O(1) public-key storage advantage over SOCOSLO and FI-BAF. It has the largest private key to enable pre-computation, but this can be replaced with scalar multiplication for a compact private key.

Preliminaries

This section provides definitions for terms used within.

Notation: $\|$ and $|x|$ denote concatenation and the bit length of variable x, respectively. $x \xleftarrow{\$} \mathcal{S}$ means variable x is randomly selected from the finite set $\mathcal{S}$ using a uniform distribution. $|\mathcal{S}|$ denotes the cardinality of set $\mathcal{S}$. $\{0,1\}^*$ denotes a set of binary strings of any finite length.

$$\{x_i\}_{i=1}^n$$

denotes the set of items $(x_1, x_2, \ldots, x_n)$. log x denotes $\log_2$ x. $H_i:\{0,1\}^* \rightarrow \{0,1\}^\kappa$, $i \in \{0,1\}$ are distinct full domain hash functions, where $\kappa$ is the security parameter. T denotes the maximum number of items to be signed in a given signature scheme. The schemes described herein operates over epochs, in which $L_2$ items (e.g., log entries) are processed, with a total $L_1$ epochs available s.t. $T=L_1 \cdot L_2$. The variable $$s_i^{j_0, j_1}$$

denotes the aggregated (or derived) value of s for the iteration range $j_0 \leq j \leq j_1$ in the epoch i.

$$M_i^j \in \overleftarrow{M_1}$$

means that $$M_i^j$$

belongs to set of items $\overleftarrow{M_1}$. $\overleftarrow{M} = \{\overleftarrow{M_1}\}_{i \in \overleftarrow{1}}$ $\overleftarrow{1}$ denotes a super vector where each $\overleftarrow{M_1}$ contains $L_2$ messages and $\overleftarrow{1}$ are epoch indices of $\overleftarrow{M}$.

Definition 2.1. An aggregate signature scheme ASGN consists of four algorithms (Kg, Agg, ASig, AVer) as follows:

(I, sk, PK)←ASGN.Kg($1^\kappa$, T): Given the security parameter $\kappa$ and the maximum number of messages to be signed T, it returns a private/public key pair (sk, PK) with a public parameter I.

$\sigma_{1,u}$←ASGN.Agg($\sigma_1, \ldots, \sigma_u$): Given a set of signatures $$\{\sigma_i\}_{i=1}^u,$$

it combines them and outputs an aggregate tag $\sigma_{1,u}$.

$\sigma_i$←ASGN.ASig(sk, $M_i$): Given the secret key sk and a message $M_i$, it returns a signature $\sigma_i$ as output.

$$b \leftarrow ASGN.AVer(PK, \{M_i\}_{i=1}^u, \sigma_{1,u}):$$

Given the public key PK, a set of messages $$\{M_i\}_{i=1}^u$$

and their corresponding aggregate signature $\sigma_{1,u}$, it outputs b=1 if $\sigma_{1,u}$ is valid or b=0 otherwise.

OSLO schemes rely on the intractability of Discrete Logarithm Problem (DLP).

Definition 2.2. Let $\mathbb{G}$ be a cyclic group of order q, let $\alpha$ be a generator of $\mathbb{G}$, and let DLP attacker $\mathcal{A}$ be an algorithm that returns an integer in $\mathbb{Z}_{q \cdot}$. Consider the following experiment:

Experiment Expt$_{\mathbb{G},\alpha}^{DL}$($\mathcal{A}$):

b $\xleftarrow{\$}$ $\mathbb{Z}_q^*$, B←$\alpha^b$ mod q, b'←$\mathcal{A}$(B),

If $\alpha^{b'}$ mod p=B then return 1, else return 0

The DL-advantage of $\mathcal{A}$ in this experiment is defined as:

$$Adv_G^{DL}(\mathcal{A}) = Pr\left[Expt_{\mathbb{G},\alpha}^{DL}(\mathcal{A}) = 1\right]$$

The DL advantage of ($\mathbb{G}$, $\alpha$) in this experiment is defined as follows:

$$Adv_G^{DL}(t) = \max_{\mathcal{A}}\{Adv_G^{DL}(\mathcal{A})\},$$

where the maximum is over all $\mathcal{A}$ having time complexity t.

SOCOSLO uses a Boyko-Peinado-Venkatesan (BPV) generator. It reduces the computational cost of expensive operations (e.g., EC scalar mul.) via pre-computation technique. It consists of two algorithms described as follows:

1. $(\Gamma, v, k) \leftarrow$ BPV.Offline($1^\kappa$, p, q, a): This algorithm chooses BPV parameters (v, k) as the size of the pre-computed table and number of randomly selected elements, respectively. Then, it generates the pre-computed table $$\Gamma = \{r_i, R_i\}_{i=1}^{v}.$$

2. (r, R) $\leftarrow$ BPV.Online($\Gamma$): This algorithm generates a random set $S \in \{1, \ldots, v\}$ of size $|S|=k$. Then, it computes a one-time commitment pair (r$\leftarrow\Sigma_{i \in S} r_i$ mod q, R$\leftarrow\Pi_{i \in S} R_i$ mod p).

System Models

Figure 1:
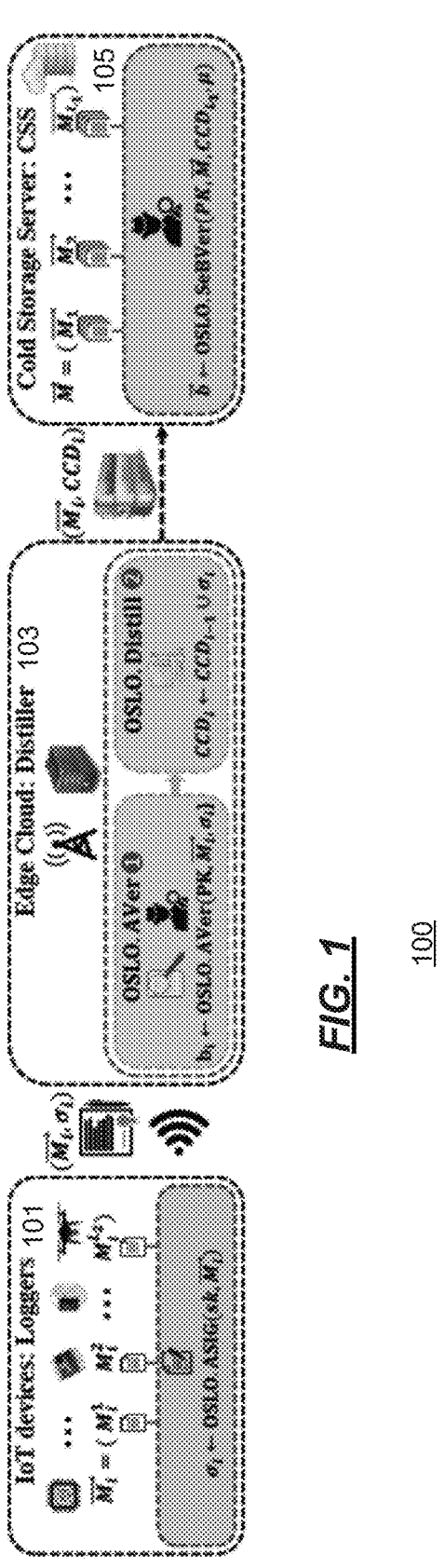
FIG. 1. Is an illustration of an example system 100.

The system model follows a AS-based secure logging model in which a logger (i.e., IoT device) computes authentication tags (e.g., digital signatures) on its log entries to be publicly verified later. Specifically, the system model supports an IoT-Cloud continuum wherein vast quantities of IoT devices generate log streams and report them to an (edge) cloud for analysis. As depicted in FIG. 1, the system 100 consists of three main entities, one more loggers 101, one or more distillers 103, and one or more cold storage servers 105. More or fewer entities may be supported. Each entity may be implemented in part using one or more computing devices such as the computing device 800 illustrated with respect to FIG. 8.:

The logger 101 may be an end-user IoT device (e.g., medical sensor). Each logger 101 collect sensitive information (e.g., personal, health), and periodically uploads the information with their corresponding log entries to a nearby edge server (e.g., access point). Each logger 101 is expected to be resource-limited in terms of computation, storage, battery, and bandwidth. Each logger 101 may provide their signed log entries to the distiller 103.

The distiller 103 receives the signed logs from the loggers 101 and preforms a distillation process on the received logs. The distillation process may separate the valid entries in the received logs from the invalid entries. The distiller 105 may maintain Cold Cryptographic Data (CCD) that harbors valid batches of log entries with their compressed (and adjustable) tags in various granularities. In some embodiments, the distiller 103 may keep the invalid log entry-signature pairs individually. As may be appreciated, in the vast majority of real-life applications, the number of invalid (flagged) entries usually form only a negligible part of the entire log set. Hence, the valid entries dominate the storage of the CCD. After the distillation, the distiller 103 may provide the CCD to the cold storage servers 105 for long-term maintenance and verification.

The cold storage server (CSS) 105 receives the distilled CCD from the distiller 103 and provides a StaaS service for the IoT devices (e.g., loggers 101) of the system 100. The CSS server 105 may receive requests for particular log entries of the loggers 101, and may provide proof that the particular log entries are valid and trustworthy. Or in the case on invalid log entries, may provide proof that the entries are not valid and cannot be trusted. To provide the service, the CSS 105 may include one or more validators that periodically validate (or invalidate) the stored CCD.

The system 100 may follow the threat model of cryptographic audit log techniques originally introduced by Schneier et al. and then improved in various subsequent cryptographic works. In the system 100, the adversary is an active attacker that aims to forge and/or tamper audit logs to implicate other users. The state-of-the-art cryptographic secure logging schemes rely on digital signatures to thwart such attacks with public verifiability and non-repudiation. The system 100 may use signer-efficient (EC-based) aggregate signature-based approaches due to their compactness and fast batch verification properties.

In particular, the system 100 may use the Aggregate Existential Unforgeability Under Chosen Message Attack (A-EU-CMA) security model. The A-EU-CMA security model considers the homomorphic properties of aggregate signatures and can offer desirable features such as log order preservation (if enforced) and truncation detection for signature batches. OSLO schemes are single-signer aggregate signatures, and therefore inter-signer aggregations are not discussed.

Definition 3.1. A-EU-CMA experiment for ASGN is as follows:

Experiment $Expt_{ASGN}^{A-EU-CMA}(\mathcal{A})$

1. $(I, sk, PK) \leftarrow ASGN.Kg(1^\kappa, T)$,

2. $(M^*, \sigma^*) \leftarrow \mathcal{A}^{RO(.), ASGN.ASig_{sk}(\overline{M})}(PK)$, 3. If $ASGN.AVer(PK, M^*, \sigma^*) = 1 \& M^* \subset \{\overleftarrow{M_1}\}_{i=1}^{L_1}$, return 1 else 0.

The $A-EU-CMA$ of $\mathcal{A}$ is defined as $$Adv_{ASGN}^{A-EU-CMA}(\mathcal{A}) = Pr[Expt_{ASGN}^{A-EU-CMA}(\mathcal{A}) = 1].$$

The A-EU-CMA advantage of ASGN is defined as $$Adv_{ASGN}^{A-EU-CMA}(t, T', T) = \max_{\mathcal{A}}\{Adv_{ASGN}^{A-EU-CMA}(\mathcal{A})\},$$

where the maximum is over $\mathcal{A}$ having time complexity t, with at most T' queries to RO(.) and T queries to ASGN.ASig(.).

The oracles reflect how OSLO works as an ASGN scheme. The signing oracle ASGN.ASig(.) returns an aggregate signature a on a batch of messages $\overleftarrow{M} =(\overleftarrow{M_1}, ..., \overleftarrow{M_{L_1}})$ computed under sk. ASGN.Agg(.) aggregates the individual (or batch) signatures of these messages. ASGN.Agg(.) can be performed during the signing or before verification (e.g., in the distillation). It can aggregate additive or multiplicative components $\delta_i \in \sigma_i$. RO(.) is a random oracle from which $\mathcal{A}$ can request the hash of any message of her choice up to T' messages.

Proposed Schemes

The goal is to create new cryptographic secure logging schemes that can meet the stringent requirements of low-end IoT devices with efficient signing and compact signatures while achieving fast verification and optimal storage in the cloud. These goals include: (i) A near-optimal signer efficiency with no costly EC-scalar multiplication or modular exponentiation. (ii) Compact aggregate tag storage and transmission. (iii) $\mathcal{O}$ (1) final cryptographic storage for the cold storage, which means $\mathcal{O}$ (1) public key and signature size for maximum compression. (iv) Fast batch verification for a large number of messages. (v) Ability to aggregate tags in any desired granularity at the signer and/or verifier sides.

Among the existing aggregate signatures, EC-based signer-efficient variants have the best potential for IoT, yet lack the necessary compactness and fast verification for cold storage applications. They transform the Schnorr signature into a one-time aggregate signature, in which the generation and storage of costly commitments $$\left(R \leftarrow \alpha^r \bmod q, r \xleftarrow{\$} \mathbb{Z}_q^*\right)$$

are shifted to the key generation and verifier, respectively. In a nutshell, the signing process separates the message M from the commitment by replacing H(M‖R) with H(M‖x), where x is one-time randomness. x cannot be disclosed before signing and does not admit aggregation. Hence, it enforces O(T) storage and expensive batch verification, which are extremely costly.

To address the signer versus verifier bottleneck conundrum several new techniques are proposed. FIG. 1 illustrates the system model 100 and OSLO's high-level functionalities. First are described the data structures and new seed management strategy to cope with linear seed storage. Next is presented the proposed schemes SOCOSLO and FIPSO-SLO that offer efficient signing, compact server storage, and batch verification with various granularity options.

OSLO Data Types and Seed Management

OSLO Data types: OSLO Tree-based structure (OSLOT) is a hash-based tree for seed storage and management, in which the leaves are one-time random seeds x, and the left and right children are computed via $H_{0,1}$, respectively. Let $L_1$ and D=log $L_1$ be the maximum number of leaves and tree depth, respectively. OSLOT nodes $x_d[i]$ at depth d, $0 \le d \le D$, for index i, $0 \le i \le 2^d$, are computed as:

$$x_d[i] = \begin{cases} H_0\left(x_{d-1}\left[\left\lfloor\frac{i}{2}\right\rfloor\right]\right), & \text{if } i \equiv 0 \bmod 2 \\ H_1\left(x_{d-1}\left[\left\lfloor\frac{i}{2}\right\rfloor\right]\right), & \text{if } i \equiv 1 \bmod 2 \end{cases}$$

Disclosed Seeds (DS) is a hash table structure. It maintains the disclosed nodes as values and their coordinates (i.e., depth d, index i) as keys. Formally, it is presented as follows: DS: (d, $i_d$)→$x_d[i_d]$, where $0 \le d \le D$ and $0 \le i_d \le 2^d - 1$.

The Seed Management Functions (SMF) are formalized in FIG. 2: (i) Seed Computation (SC) 201 takes the source node $x_{d_0}[i_0]$ and computes the requested child $x_d[i]$ by traversing OSLOT tree. (ii) Seed Storage Optimizer (SSO) 203 discloses ancestor nodes progressively when the logger completes a given number of epochs. Given leaf index i and the OSLOT root $x_0[1]$, it outputs a compact $DS_i$. SSO 203 seeks the seeds that share the same ancestor, thereby ensuring at most $O(\log L_1)$ storage. (iii) Seed Retrieval (SR) 205 returns the seed $x_D[i]$ if DS contains an ancestor for leaf of index i.

Figure 3A:
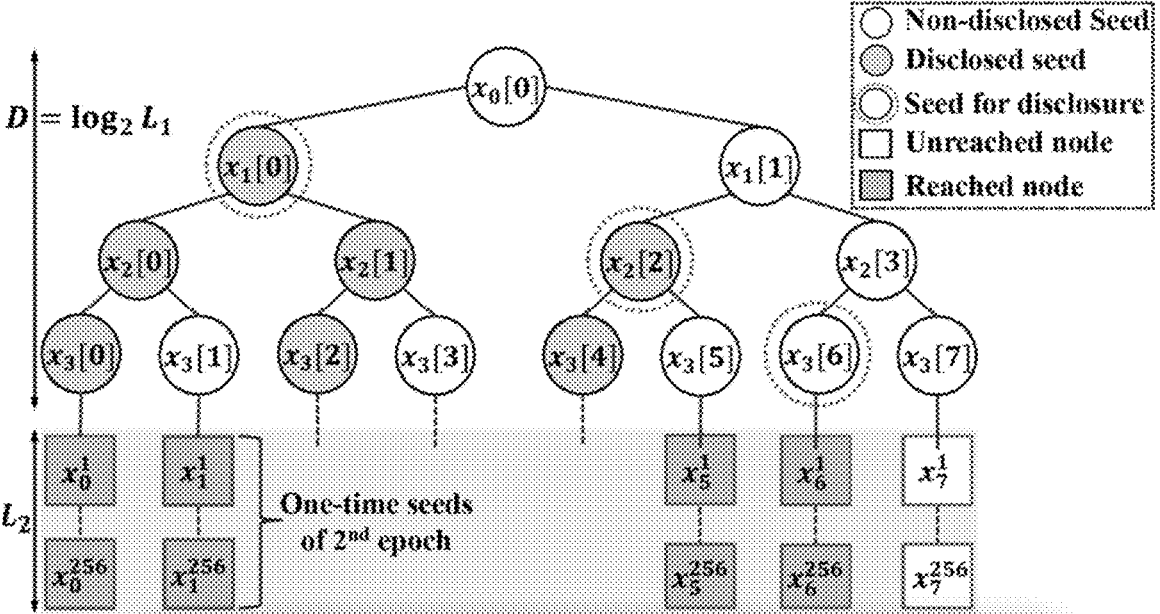
FIG. 3A is an illustration of an instance of OSLOT after completing the $6^{th}$ epoch.

An instance of OSLOT is provided in FIG. 3A, where ($L_1=2^3$, $L_2=2^8$). FIG. 3A shows the OSLOT status after completing the $6^{th}$ epoch. The seeds, to be disclosed, are highlighted. They can be determined by running SSO 203 algorithm. The SSO 203 output is: $DS_6 \leftarrow SSO(x_0[1],6)$ where $DS_6=\{(1,0):x_1[0]; (2,2):x_2[2]; (3,6):x_3[6]\}$.

The advantage of OSLOT seed management is apparent over the linear disclosure of one-time commitments in Schnorr-like schemes. It transforms $O(T)$ of both logger transmission and verifier storage into (at most) $O(\log L_1)$. Upon finishing all epochs, the logger discloses the OSLOT root $x_0[1]$, enabling $O(1)$ verifier storage.

Signer-Optimal Coarse-Grained OSLO (SOCOSLO)

SOCOSLO offers a near-optimal signing efficiency in terms of both computational and storage overhead. It offloads an aggregate tag upon signing an epoch of individual log entries. Unlike previous EC-based signature designs, SOCOSLO pre-stores a $O(L_1)$ sublinear number of public commitments (R) at the verifier side, and compact them after receiving the authenticated logs from IoT devices. In the following, the formal description of SOCOSLO routines are explained.

SOCOSLO Digital Signature Algorithms: The aggregate signature functions of SOCOSLO are shown in FIG. 4.

In SOCOSLO. Kg(.) 400 for a given T, first is selected the number of epochs and items to be signed in an epoch as $L_1$ and $L_2$, respectively (Step 1). Next the initial ephemeral randomness $r_0$ and the root of OSLOT tree $x_0[0]$ are generated (Step 2). These values are used to generate ephemeral public commitments (R) and one-time randomness (x) for a given epoch state St: (i). EC-based parameters (p, q, $\alpha$) and private/public key pair (y, Y) (Step 3-4) are generated. SOCOSLO is coarse-grained, and therefore the commitments for each epoch are combined as in Step (5-7), which results in initial $O(L_1)$ and final $O(1)$ storage at the verifier via aggregation. The private/public key and parameters are as in Steps (8-9).

SOCOSLO.Agg(.) 420 is a keyless signature aggregate function with a dual signature combination mode. That is, given tag element $s \in \sigma$ or $R \in \sigma$, it performs additive or multiplication aggregation, respectively.

SOCOSLO.ASig(.) 440 is an aggregate signature generation that signs each entry and sequentially aggregates into a single umbrella signature (i.e., the tag representing all items in the given epoch). The seed $x_D[i]$ is computed once per epoch i (Step 1) and used to derive one-time seeds $$x_i^j$$

(Step 4). The aggregate signature $$s_i^{1,j}$$

is computed with only a few hash calls and modular additions plus a modular multiplication (Step 3-5). This makes SOCOSLO the most signer efficient alternative. At the end of epoch i, the logger determines a set of disclosed seeds $DS_i$ via SSO, updates its internal state (Step 6), and outputs the condensed signature $$\sigma_i^{1,L_2}$$

(Step 6-7).

Figure 3B:
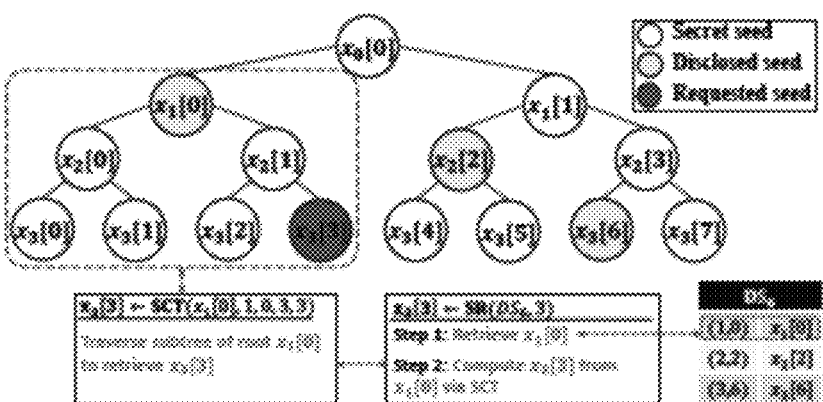
FIG. 3B is an illustration of a mechanism for seed retrieval.

SOCOSLO.AVer(.) 450 receives the public key PK, a set of messages $\overline{M}$, and their corresponding aggregate signature a as input. The verifier checks if messages comply with the epoch size, and then identifies the format of the aggregate signature to choose component R (Step 1). SOCOSLO.AVer (.) 450 can be invoked by the edge cloud or CSS 105 as the final verifier. This difference dictates if the aggregate commitment R is included in the initial public key PK or the aggregate signature $\sigma$. The SOCOSLO.Distill(.) function can be used to verify the entries and then compact them according to a granularity parameter ρ. Hence, if the verification is done during the distillation, the verifier already has $$R_i^{1,L_2} \in \overleftarrow{R}$$

as part of PK and this value is used in the verification (Step 8). Otherwise, if the verification is run by the CSS 105, then R can be found as a part of the signature in CCD. The verifier retrieves the seeds in the given epoch (Step 4) and then computes the aggregate hash component e (Steps 2-7). Finally, the aggregate signature is verified (Step 8). FIG. 3B depicts the mechanism for seed retrieval and consists of the verifier's view after finishing $6^{th}$ epoch. FIG. 3B illustrates the request to retrieve the seed of the $3^{rd}$ epoch.

SOCOSLO Distillation and Selective Batch Verification: The verification involves two entities of the system 100 (*i*) Distiller 103 (*ii*) Cold Storage Server (CSS) 105. The cryptographic data structure (CCD) is maintained by the CSS 105 and updated by distillers 103. FIG. 4B formally describes the distillation and batch verification processes. First, both entities initialize CCD as empty sets of signatures. SOCOSLO.Distill(.) 460 updates CCD structure by aggregating valid signatures in $CCD^V$ (Step 2-12). It keeps valid tags according to the granularity parameter ρ. Hence, CSS maintains a condensed tag $\sigma_A$, set of umbrella signatures $CCD^U$, and individual invalid signatures $CCD'$ (Step 17). SOCOSLO.SeBVer(.) 470 is a selective batch verification routine that can be run in three modes: (i) Mode V verify the valid set which consists of one aggregate signature for all valid entries (ii) Mode U checks partial umbrella signatures in case the overall authentication (mode V) is failed. Depending on the application requirements, $CCD^U$ storage overhead can be adjusted according to the granularity parameter ρ. (iii) Mode I checks the invalid set by verifying separately each entry. The generic SOCOSLO. AVer(.) enables both the verifier and CSS to use it in the distillation and verification processes, respectively.

Fine-Grained Public-Key OSLO (FIPOSLO)

FIPOSLO employs BPV pre-computation to pre-store a constant size of one-time commitments at the logger. Previous works have shown that the incurred storage is negligible for low-end IoT. This is important for immediate and fine-grained verification at the distiller 103. More importantly, it enables the CSS 105 to authenticate log entries individually, thereby achieving accurate investigation and optimal recovery. A fine-grained variant of FIPOSLO is shown and described in FIG. 5 by the functions FIPOSLO.kg(.) 510, FIPOSLO.Sig(.) 520, and FIPOSLO.Aver(.) 530.

FIPOSLO provides various performance advantages at the distiller side. For instance, it offers an immediate verification of each message within an epoch by attaching the seed $$x_i^j$$

to the signature as shown in FIPOSLO.Sig(.) 520 (Step 7). Unlike SOCOSLO, it permits a $\mathcal{O}$ (1) public-key storage at the distiller 103. That is, the signer (logger 101) generates commitment value R t via BPV (Step 4) and includes it in the signature (Step 8). Therefore, by introducing the BPV generator, FIPOSLO eliminates the initial $\mathcal{O}(L_1)$ public key storage and enables the highest level of granularity by verifying signatures individually.

The distillation and selective batch verification functionalities are similar to SOCOSLO with minor differences and therefore are not repeated. Indeed, the verifier aggregate every signature separately. Thereby, the invalid set $CCD'$ contains individual signatures (highest granularity) making CSS verify each invalid entry separately. As such, FIPOSLO offer better verification precision than SOCOSLO, but with slightly slower verification time.

Figure 6:
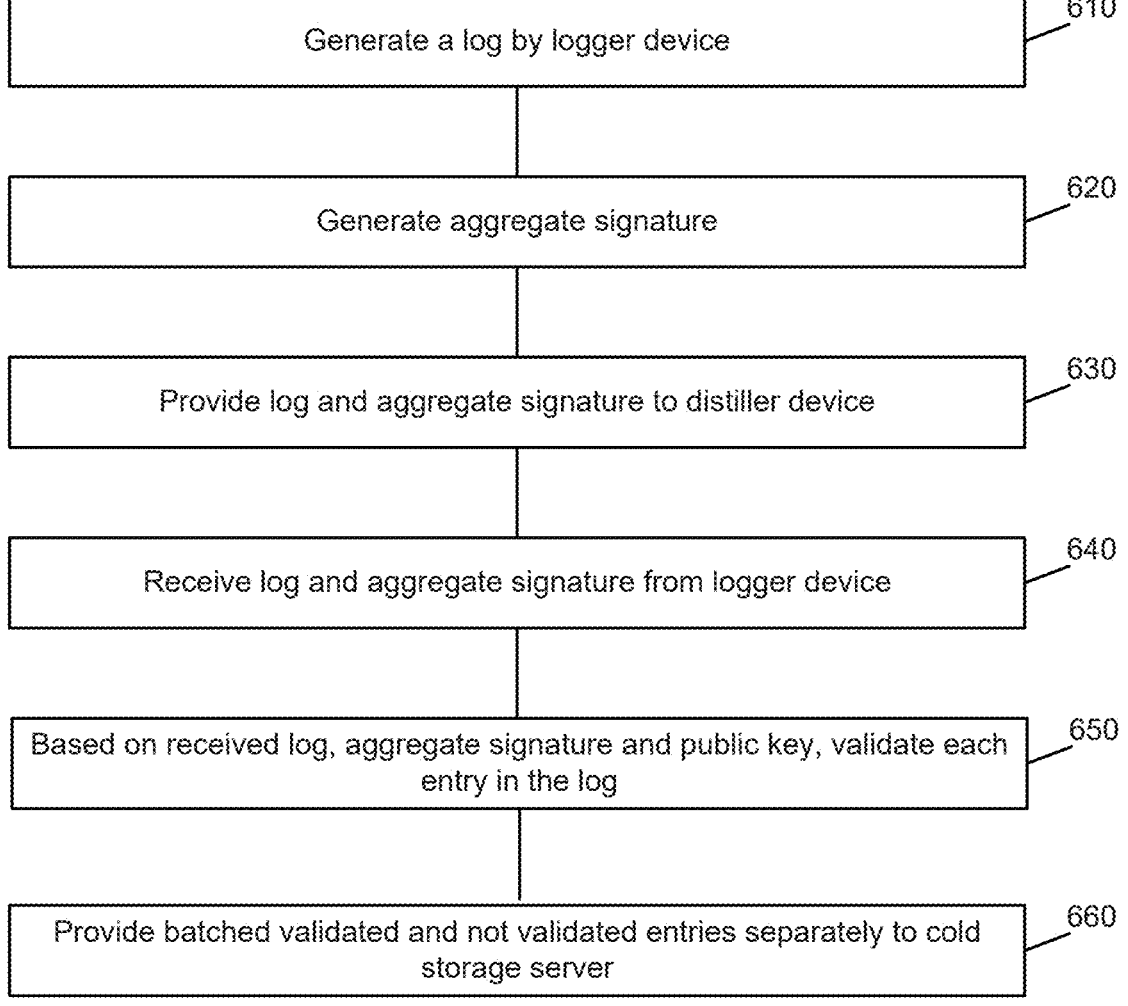
FIG. 6 is an illustration of an example method 600 for storing logs in a cold storage server 105.

FIG. 6 is an illustration of an example method 600 for storing logs in a cold storage server 105. The method 600 may be implemented by one or more loggers 101, distillers 103, and cold storage servers 105 of the system 100.

At 610, a log is generated by a logger 101. The logger 101 may be an internet-of-things device such as a sensor or a medical device. The generated log may include a variety of information generated by the logger 101 such as sensor readings at certain times, for example.

At 620, an aggregate signature is generated by the logger 101. The aggregate signature may be generated by the logger 101 for the log using a seed value. Other methods for generating an aggregate signature may be used.

At 630, the log and aggregate signature may be provided by logger 101 to a distiller 103. The logger 101 may provide the log and aggregate signature to the distiller 103 through a network. Depending on the embodiment, the log may be provided when the number of entries in the log reaches an epoch. The size of the epoch may be set by a user or administrator.

At 640, the distiller 103 receives the log and aggregate signature from the logger 101. The distiller 103 may receive logs and aggregate signatures from a plurality of loggers 101 associated with the system 100.

At 650, the distiller 103 validates each entry in the received log, The distiller may validate each entry in the received log using the aggregate signature and the public key of the logger 101 associated with the log. The distiller 103 may distill the entries received log and may batch the entries in the received log into a batch of entries that were successfully validated and a batch of entries that were not successfully validated.

At 660, the batched validated and not validated entries are provided to a cold storage server 105. The batched entries may be provided by the distiller 103 to the cold storage server 105 through the network.

Figure 7:
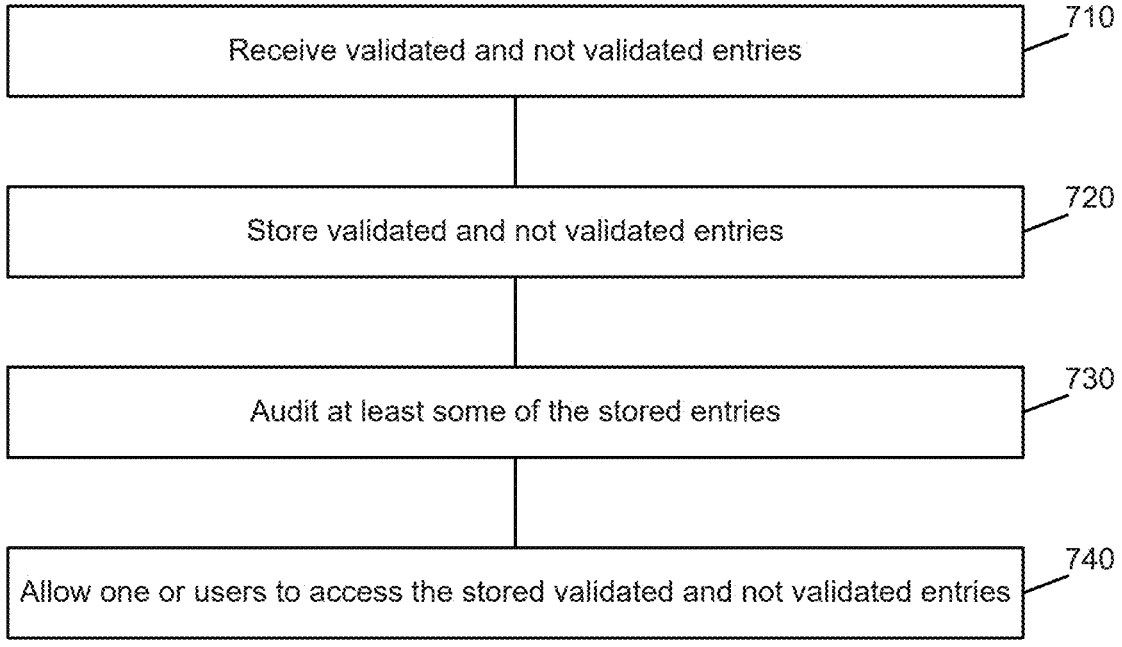
FIG. 7 is an illustration of an example method 700 for providing access to logs in a cold storage server 105.

FIG. 7 is an illustration of an example method 700 for providing access to logs in a cold storage server 105. The method 700 may be implemented by one or more cold storage servers 105 of system 100.

At 710, validated and not validated entries are received. The batched validated and not validated entries may be received by the cold storage server 105 from the distiller 103. In some embodiments, each batch may be signed using an aggregate signature of the distiller 103.

At 720, the stored validated and not validated entries are stored. The entries may be stored by the cold storage server 105.

At 730, at least some of the validated entries are audited. The at least some of the validated entries may be validated by a validator of the cold storage server 105 using the public key of the distiller 103 that provided the logs.

At 740, access to the stored validated and not validated entries is provided. The access may be provided by the cold storage server 105 to one or more users. For example, the code storage server 105 may provide an API through which users can request to view particular entries of the stored logs of each logger 101. The code storage server 105 may provide the requested entries along with indicators of whether or not the entries were validator or not validated by the cold storage server 10 and/or the distiller 103.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for cryptographic verifiability comprising:

a plurality of logger devices;

at least one distiller device; and at least one cold storage server, wherein each logger device is adapted to:

generate a log, wherein the log comprises a plurality of entries and each entry is associated with a digital signature;

generate an aggregate signature for the log based on the digital signature associated with each entry, wherein the aggregate signature is an elliptic-curve based aggregate signature generated using one-time keys derived from a tree-based structure comprising a binary tree having a root seed from which child seeds are derived using pseudorandom function chains along tree paths of the tree-based structure;

provide the generated log and the aggregate signature to the at least one distiller device, wherein the at least one distiller device is adapted to:

receive a log from each of the logger devices, and for each received log from a logger device:

validate each entry in the log using the associated digital signature;

for each entry in the log that is validated:

batch the validated entries and associated digital signatures;

provide the batched validated entries to the at least one cold storage server;

for each entry in the log that is not validated:

batch the not validated entries and associated digital signatures; and provide the batched not validated entries to the at least one cold storage server; and wherein the at least one cold storage server is adapted to:

receive the batched validated and not validated entries;

audit at least some of the batched validated entries using a public key associated with the at least one distiller device; and allow one or more external users to view the batched validated and not validated entries.

2. The system of claim 1, wherein each logger of the plurality of loggers is an internet-of-things device.

3. The system of claim 1, wherein the at least one distiller device is adapted to, for each received log from a logger device:

receive a public key associated with the at logger device; and validate each entry in the log using the aggregated digital signature and the received public key.

4. The system of claim 1, wherein the distiller adapted to provide the batched validated entries to the at least one cold storage server comprises the distiller adapted to generate an aggregated digital signature for the batched validated entries, and provide the generated digital signature with the batched validated entries.

5. A method for cryptographic verifiability comprising:

generating a log by a logger device of a plurality of logger devices, wherein the log comprises a plurality of entries and each entry is associated with a digital signature;

generating an aggregate signature for the log based on the digital signature associated with each entry by the logger device, wherein the aggregate signature is an elliptic-curve based aggregate signature generated using one-time keys derived from a tree-based structure comprising a binary tree having a root seed from which child seeds are derived using pseudorandom function chains along tree paths of the tree-based structure;

providing the generated log and the aggregate signature to at least one distiller device by the logger device;

receiving the log from the logger device by the at least one distiller device;

validating each entry in the log using the associated digital signature by the at least one distiller device;

for each entry in the log that is validated:

batching the validated entries and associated digital signatures by the at least one distiller device; and providing the batched validated entries to at least one cold storage server by the at least one distiller device;

for each entry in the log that is not validated:

batching the not validated entries and associated digital signatures by the at least one distiller device; and providing the batched not validated entries to the at least one cold storage server by the at least one distiller device;

receiving the batched validated and not validated entries by the at least one cold storage server;

auditing at least some of the batched validated entries by the at least one cold storage server; and allowing one or more external users to view the batched validated and not validated entries by the at least one cold storage server.

6. The method of claim 5, wherein each logger of the plurality of loggers is an internet-of-things device.

7. The method of claim 5, further comprising:

receiving a public key associated with the at logger device; and validating each entry in the log using the aggregated digital signature and the received public key.

8. The method of claim 5, wherein the logger generates the aggregate signature using a tree-based seed data structure.

9. The method of claim 5, further comprising generating an aggregated digital signature for the batched validated entries, and providing the generated digital signature with the batched validated entries.

10. A non-transitory computer-readable medium with computer-executable instructions stored thereon that when executed by one or more computing devices cause the one or more computing devices to perform a method comprising:

generating a log by a logger device of a plurality of logger devices, wherein the log comprises a plurality of entries and each entry is associated with a digital signature;

generating an aggregate signature for the log based on the digital signature associated with each entry by the logger device, wherein the aggregate signature is an elliptic-curve based aggregate signature generated using one-time keys derived from a tree-based structure comprising a binary tree having a root seed from which child seeds are derived using pseudorandom function chains along tree paths of the tree-based structure;

providing the generated log and the aggregate signature to at least one distiller device by the logger device;

receiving the log from the logger device by the at least one distiller device;

validating each entry in the log using the associated digital signature by the at least one distiller device;

for each entry in the log that is validated:

batching the validated entries and associated digital signatures by the at least one distiller device; and providing the batched validated entries to at least one cold storage server by the at least one distiller device;

for each entry in the log that is not validated:

batching the not validated entries and associated digital signatures by the at least one distiller device; and providing the batched not validated entries to the at least one cold storage server by the at least one distiller device;

receiving the batched validated and not validated entries by the at least one cold storage server;

auditing at least some of the batched validated entries by the at least one cold storage server; and allowing one or more external users to view the batched validated and not validated entries by the at least one cold storage server.

11. The computer-readable medium of claim 10, wherein each logger of the plurality of loggers is an internet-of-things device.

12. The computer-readable medium of claim 10, further comprising:

receiving a public key associated with the at logger
   device; and validating each entry in the log using the aggregated
   digital signature and the received public key.

\*   \*   \*   \*   \*